United States Patent
Li et al.

(10) Patent No.: US 12,535,887 B2
(45) Date of Patent: Jan. 27, 2026

(54) FINGER SWIPE-BASED SMART WATCH USER INTERFACE (UI) CONTROL

(71) Applicant: INNOPEAK TECHNOLOGY, INC., Palo Alto, CA (US)

(72) Inventors: Xiang Li, Palo Alto, CA (US); Mingdian Liu, Palo Alto, CA (US)

(73) Assignee: INNOPEAK TECHNOLOGY, INC., Palo Alto, CA (US)

( * ) Notice: Subject to any disclaimer, the term of this patent is extended or adjusted under 35 U.S.C. 154(b) by 0 days.

(21) Appl. No.: 18/859,012

(22) PCT Filed: May 2, 2022

(86) PCT No.: PCT/US2022/027314
§ 371 (c)(1),
(2) Date: Oct. 22, 2024

(87) PCT Pub. No.: WO2022/221781
PCT Pub. Date: Oct. 20, 2022

(65) Prior Publication Data
US 2025/0284337 A1    Sep. 11, 2025

(51) Int. Cl.
*G06F 3/01* (2006.01)
*G06F 1/16* (2006.01)
*G06F 3/0487* (2013.01)

(52) U.S. Cl.
CPC .............. *G06F 3/015* (2013.01); *G06F 1/163* (2013.01); *G06F 3/017* (2013.01); *G06F 3/0487* (2013.01)

(58) Field of Classification Search
CPC .......... G06F 3/015; G06F 1/163; G06F 3/017; G06F 3/0487; G06F 3/014; G06F 3/0482;
(Continued)

(56) References Cited

U.S. PATENT DOCUMENTS

2015/0061842 A1* 3/2015 Yoon ...................... G04G 21/04
340/12.5
2015/0324001 A1  11/2015 Yanai et al.
(Continued)

OTHER PUBLICATIONS

International Search Report and Written Opinion, International Application No. PCT/US2022/027314, mailed Sep. 2, 2022 (9 pages).

*Primary Examiner* — Temesghen Ghebretinsae
*Assistant Examiner* — Ivelisse Martinez Quiles
(74) *Attorney, Agent, or Firm* — Ladas & Parry LLP

(57) ABSTRACT

Novel tools and techniques are provided for implementing novel finger swipe-based smart watch user interface ("UI") control or novel micro finger gesture-based UI control for wrist-wearable device. In various embodiments, a computing system may analyze biosensor data to identify micro-gestures of a user's finger, the biosensor data being received from biosensor(s) disposed on a wrist-wearable device when it is being worn by the user. In response to identifying a first micro-gesture of the user's finger in the biosensor data, the computing system may determine whether the first micro-gesture corresponds to one of a finger-swipe command or a finger-drag command for controlling a UI of the wrist-wearable device. If so, the computing system may cause the UI of the wrist-wearable device to perform one or more first functions in response to the one of the finger-swipe command or the finger-drag command.

18 Claims, 7 Drawing Sheets

(58) Field of Classification Search
CPC ... G06F 3/04847; G06F 3/0485; G06F 3/0486
See application file for complete search history.

(56) References Cited

U.S. PATENT DOCUMENTS

| | | |
|---|---|---|
| 2020/0285322 A1 | 9/2020 | Johri |
| 2021/0124417 A1* | 4/2021 | Ma .......................... G06F 3/015 |
| 2021/0142214 A1 | 5/2021 | Maalouf et al. |
| 2021/0232225 A1* | 7/2021 | Cipoletta ................ G06F 3/017 |

* cited by examiner

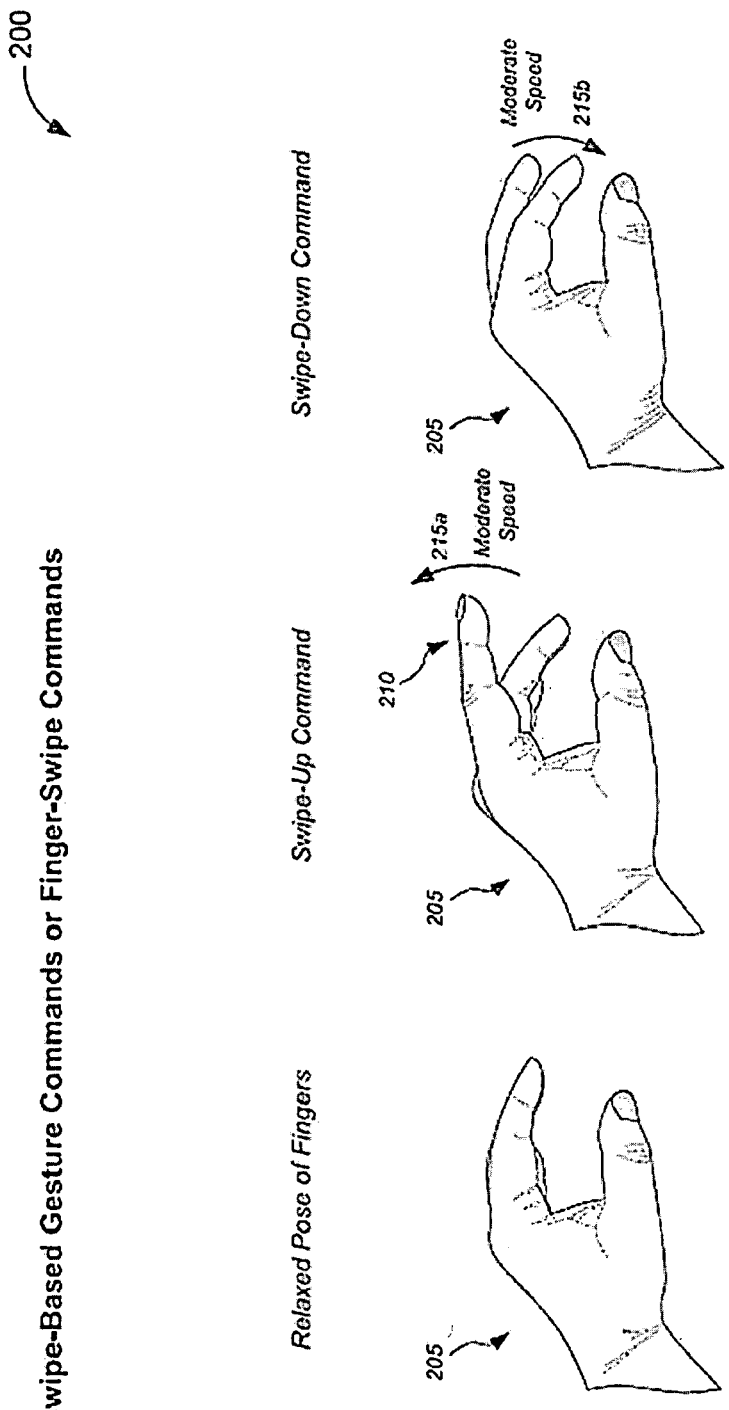

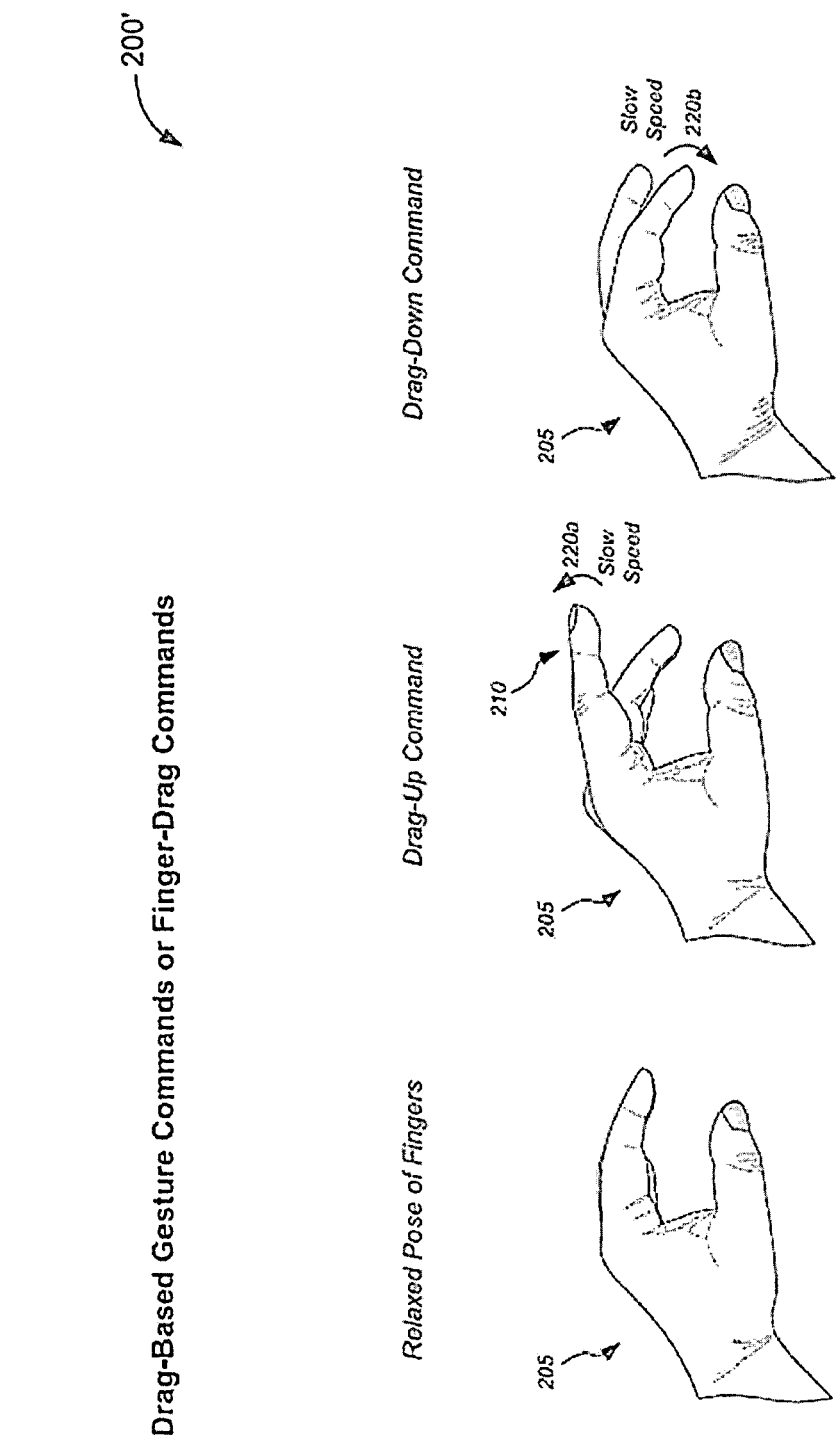

Finger-Swipe Commands for Controlling UI of Wrist-Wearable Device

Finger-Drag Commands for Controlling UI of Wrist-Wearable Device

FINGER SWIPE-BASED SMART WATCH USER INTERFACE (UI) CONTROL

CROSS-REFERENCE TO RELATED APPLICATIONS

This application is a 35 U.S.C. § 371 National Phase conversion of International (PCT) Patent Application No. PCT/US2022/027314 filed May 2, 2022, the contents of which are herein incorporated by reference in their entireties.

FIELD

The present disclosure relates, in general, to methods, systems, and apparatuses for implementing user interface ("UI") controls, and, more particularly, to methods, systems, and apparatuses for implementing novel finger swipe-based smart watch UI control or novel micro finger gesture-based UI control for wrist-wearable device.

BACKGROUND

Hand gestures have become a popular type of perceptual computing user interface or UI that allows wearable devices, like smartwatches, to capture and interpret human hand gestures as commands. For instance, conventional swipe gestures for commercial devices (such as touchscreen display devices like smartphones, smartwatches, tablet computers, laptop computers, or the like) provide a very natural way for a user to interact with the devices, in order to navigate the UI elements, like menus or pages, or the like. However, such conventional swipe gestures require that the user's finger be in physical contact with (i.e., to touch) the screen, which has sensors underneath to detect such gestures. In the case of smartwatches, it may be inconvenient or impossible for the user to use such touch-based swipe gestures—e.g., if the user's other hand is not free, or the like.

Hence, there is a need for more robust and scalable solutions for implementing UI controls.

SUMMARY

The techniques of this disclosure generally relate to tools and techniques for implementing user interface ("UI") controls, and, more particularly, to methods, systems, and apparatuses for implementing novel finger swipe-based smart watch UI control or novel micro finger gesture-based UI control for wrist-wearable device.

In an aspect, a method may comprise analyzing, using a computing system, first sensor data to identify micro-gestures of a finger of a user compared with a plurality of predetermined micro-gestures, the first sensor data being received from at least one first sensor disposed on a wrist-wearable device when the wrist-wearable device is being worn by the user, the at least one first sensor being configured to detect micro-gestures of the finger of the user without any fingers of the user touching the wrist-wearable device; in response to identifying a first micro-gesture of the finger of the user in the first sensor data, determining, using the computing system, whether the first micro-gesture corresponds to one of a finger-swipe command or a finger-drag command for controlling a user interface ("UI") of the wrist-wearable device; and based on a determination that the first micro-gesture corresponds to one of a finger-swipe command or a finger-drag command for controlling the UI of the wrist-wearable device, causing, using the computing system, the UI of the wrist-wearable device to perform one or more first functions in response to the one of the finger-swipe command or the finger-drag command.

In another aspect, a wrist-wearable device may comprise at least one first sensor that is configured to detect micro-gestures of one or more fingers of a user, without any fingers of the user touching the wrist-wearable device; at least one processor; and a non-transitory computer readable medium communicatively coupled to the at least one processor. The non-transitory computer readable medium may have stored thereon computer software comprising a set of instructions that, when executed by the at least one processor, causes the wrist-wearable device to: analyze first sensor data to identify micro-gestures of a finger of the user compared with a plurality of predetermined micro-gestures, the first sensor data being received from the at least one first sensor disposed on the wrist-wearable device when the wrist-wearable device is being worn by the user; in response to identifying a first micro-gesture of the finger of the user in the first sensor data, determine whether the first micro-gesture corresponds to one of a finger-swipe command or a finger-drag command for controlling a user interface ("UI") of the wrist-wearable device; and based on a determination that the first micro-gesture corresponds to one of a finger-swipe command or a finger-drag command for controlling the UI of the wrist-wearable device, cause the UI of the wrist-wearable device to perform one or more first functions in response to the one of the finger-swipe command or the finger-drag command.

In yet another aspect, a non-transitory computer-readable storage medium is provided, which including instructions that, when executed by at least one processor of a computing system, cause the computing system to: analyze first sensor data to identify micro-gestures of a finger of a user compared with a plurality of predetermined micro-gestures, the first sensor data being received from at least one first sensor disposed on a wrist-wearable device when the wrist-wearable device is being worn on a wrist of the user, the at least one first sensor being configured to detect micro-gestures of the finger of the user without any fingers of the user touching the wrist-wearable device, the finger of the user being on the wrist of the user; in response to identifying a first micro-gesture of the finger of the user in the first sensor data, determine whether the first micro-gesture corresponds to one of a finger-swipe command or a finger-drag command for controlling a user interface ("UI") of the wrist-wearable device; and based on a determination that the first micro-gesture corresponds to one of a finger-swipe command or a finger-drag command for controlling the UI of the wrist-wearable device, cause the UI of the wrist-wearable device to perform one or more first functions in response to the one of the finger-swipe command or the finger-drag command; wherein the first sensor data comprises biological characteristics that correspond to motion of soft tissue in or near the wrist of the user on which the wrist-wearable device is being worn.

Various modifications and additions can be made to the embodiments discussed without departing from the scope of the invention. For example, while the embodiments described above refer to particular features, the scope of this invention also includes embodiments having different combination of features and embodiments that do not include all of the above-described features.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 2A-2F are schematic diagrams illustrating various non-limiting examples of swipe-based gesture (or finger-swipe) command and drag-based gesture (or finger-drag) command, in accordance with various embodiments.

DETAILED DESCRIPTION

Overview

Figure 1:
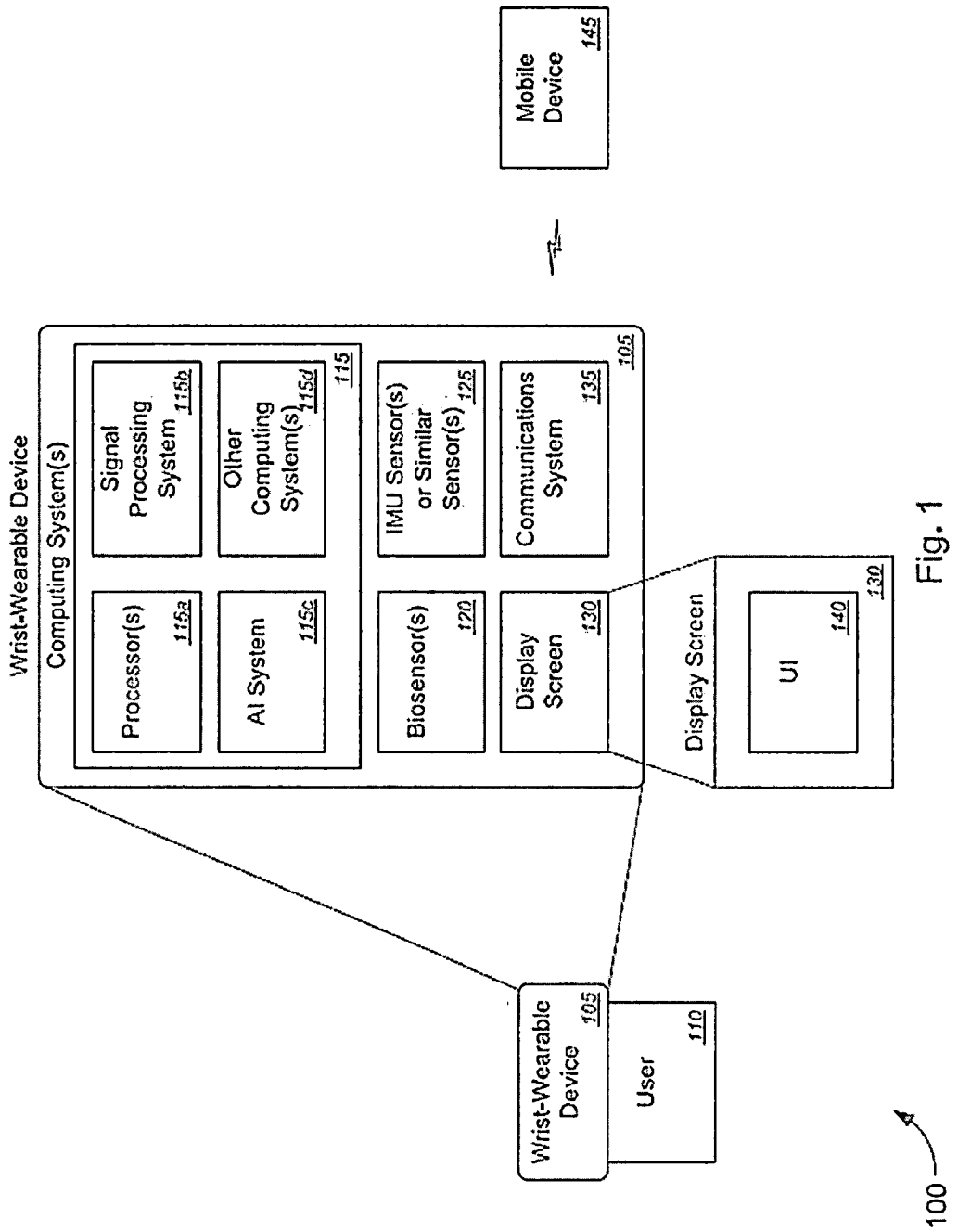
FIG. 1 is a schematic diagram illustrating a system for implementing novel micro finger gesture-based user interface ("UI") control for wrist-wearable device, in accordance with various embodiments.

Various embodiments provide tools and techniques for implementing user interface ("UI") controls, and, more particularly, to methods, systems, and apparatuses for implementing novel finger swipe-based smart watch UI control or novel micro finger gesture-based UI control for wrist-wearable device.

In various embodiments, a computing system may analyze first sensor data to identify micro-gestures of a finger of a user compared with a plurality of predetermined micro-gestures, the first sensor data being received from at least one first sensor disposed on a wrist-wearable device when the wrist-wearable device is being worn by the user, the at least one first sensor being configured to detect micro-gestures of the finger of the user without any fingers of the user touching the wrist-wearable device. In response to identifying a first micro-gesture of the finger of the user in the first sensor data, the computing system may determine whether the first micro-gesture corresponds to one of a finger-swipe command or a finger-drag command for controlling a user interface ("UI") of the wrist-wearable device. Based on a determination that the first micro-gesture corresponds to one of a finger-swipe command or a finger-drag command for controlling the UI of the wrist-wearable device, the computing system may cause the UI of the wrist-wearable device to perform one or more first functions in response to the one of the finger-swipe command or the finger-drag command.

In some embodiments, the computing system may comprise at least one of one or more processors on the wrist-wearable device, one or more processors on a mobile device that is communicatively coupled with the wrist-wearable device, a machine learning system, an artificial intelligence ("AI") system, a deep learning system, a neural network, a convolutional neural network ("CNN"), or a fully convolutional network ("FCN"), and/or the like. In some cases, the wrist-wearable device may comprise one of a smart watch, a wrist-wearable display device, or other wrist-wearable user device, and/or the like.

According to some embodiments, the at least one first sensor may comprise at least one biosensor. In some instances, the at least one biosensor may comprise at least one of one or more photoplethysmography ("PPG") sensors, one or more electromyography ("EMG") sensors, one or more sound transducers, or one or more motion transducers, and/or the like, each configured to detect biological characteristics that correspond to motion of soft tissue in or near a wrist of the user on which the wrist-wearable device is being worn. In some cases, the soft tissue may comprise at least one of one or more muscles, one or more tendons, or one or more blood vessels, and/or the like, in or near the wrist of the user. In some cases, the one or more PPG sensors may be configured to optically detect blood volume changes in the one or more blood vessels below skin tissue at or near the wrist of the user corresponding to finger movement of the user. In some instances, the one or more EMG sensors may be configured to detect electrical activity of the one or more muscles at or near the wrist of the user corresponding to finger movement of the user. In some cases, the one or more sound transducers may be configured to detect sounds within a body of the user corresponding to finger movement of the user. In some instances, the one or more motion transducers may be configured to detect motion of the one or more muscles, the one or more tendons, and the one or more blood vessels corresponding to finger movement of the user.

In some embodiments, the finger-swipe command may comprise one of a swipe-up command, a swipe-down command, a swipe-left command, or a swipe-right command, and/or the like. In some instances, the one or more first functions may comprise one of a scroll-up function, a scroll-down function, a scroll-left function, or a scroll-right function, and/or the like, for navigating through displayed content on the UI that may be displayed on a display screen of the wrist-wearable device. In some cases, the finger-swipe command may comprise one of a lifting of a finger or a lowering of the finger, each relative to a relaxed pose of fingers of a hand of the user and each performed at moderate speed.

According to some embodiments, the finger-drag command may comprise one of a drag-up command, a drag-down command, a drag-left command, or a drag-right command, and/or the like. In some cases, the one or more first functions may comprise one of a move-up function, a move-down function, a move-left function, or a move-right function, and/or the like, for navigating through displayed content on the UI that may be displayed on a display screen of the wrist-wearable device. In some instances, the finger-drag command may comprise one of a lifting of a finger or a lowering of the finger, each relative to a relaxed pose of fingers of a hand of the user and each performed at slow speed.

In some embodiments, the computing system may analyze second sensor data to detect motion of the wrist-wearable device with respect to at least one axis of rotation among three axes of rotation, the second sensor data being received from at least one second sensor disposed on the wrist-wearable device when the wrist-wearable device is being worn by the user. In response to detecting motion of the wrist-wearable device with respect to at least one axis of rotation in the second sensor data, the computing system may determine whether the detected motion of the wrist-wearable device coincides, and operates in conjunction, with the first micro-gesture that corresponds to the one of the finger-swipe command or the finger-drag command for controlling the UI of the wrist-wearable device. Based on a determination that the detected motion of the wrist-wearable device coincides, and operates in conjunction, with the first micro-gesture that corresponds to the one of the finger-swipe command or the finger-drag command for controlling the UI of the wrist-wearable device, the computing system may cause the UI of the wrist-wearable device to perform one or more second functions in response to the one of the finger-swipe command with motion or the finger-drag command with motion.

Merely by way of example, in some cases, the at least one second sensor may comprise at least one of an inertial measurement unit ("IMU") sensor or a gyroscope-based sensor, and/or the like. In some cases, the one or more second functions may comprise at least one of a scroll function or a drag function, or the like, each along a direction based on the degree of supination or pronation of a forearm connected to a wrist of the user on which the wrist-wearable device is being worn, as detected by motion of the wrist-wearable device.

In another aspect, a wrist-wearable device may comprise at least one first sensor that is configured to detect micro-gestures of one or more fingers of a user, without any fingers of the user touching the wrist-wearable device; at least one processor; and a non-transitory computer readable medium communicatively coupled to the at least one processor. The non-transitory computer readable medium may have stored thereon computer software comprising a set of instructions that, when executed by the at least one processor, causes the wrist-wearable device to: analyze first sensor data to identify micro-gestures of a finger of the user compared with a plurality of predetermined micro-gestures, the first sensor data being received from the at least one first sensor disposed on the wrist-wearable device when the wrist-wearable device is being worn by the user; in response to identifying a first micro-gesture of the finger of the user in the first sensor data, determine whether the first micro-gesture corresponds to one of a finger-swipe command or a finger-drag command for controlling a user interface ("UI") of the wrist-wearable device; and based on a determination that the first micro-gesture corresponds to one of a finger-swipe command or a finger-drag command for controlling the UI of the wrist-wearable device, cause the UI of the wrist-wearable device to perform one or more first functions in response to the one of the finger-swipe command or the finger-drag command.

In some embodiments, the wrist-wearable device may comprise one of a smart watch, a wrist-wearable display device, or other wrist-wearable user device, and/or the like. In some cases, the at least one first sensor may comprise at least one biosensor. In some instances, the at least one biosensor may comprise at least one of one or more photoplethysmography ("PPG") sensors, one or more electromyography ("EMG") sensors, one or more sound transducers, or one or more motion transducers, and/or the like, each configured to detect biological characteristics that correspond to motion of soft tissue in or near a wrist of the user on which the wrist-wearable device is being worn.

According to some embodiments, the wrist-wearable device may further comprise at least one second sensor that is configured to detect motion of the wrist-wearable control device with respect to at least one axis of rotation among three axes of rotation. In such cases, the set of instructions, when executed by the at least one processor, may further cause the wrist-wearable device to: analyze second sensor data to detect motion of the wrist-wearable device with respect to the at least one axis of rotation among the three axes of rotation, the second sensor data being received from the at least one second sensor disposed on the wrist-wearable device when the wrist-wearable device is being worn by the user; in response to detecting motion of the wrist-wearable device with respect to at least one axis of rotation in the second sensor data, determine whether the detected motion of the wrist-wearable device coincides, and operates in conjunction, with the first micro-gesture that corresponds to the one of the finger-swipe command or the finger-drag command for controlling the UI of the wrist-wearable device; and based on a determination that the detected motion of the wrist-wearable device coincides, and operates in conjunction, with the first micro-gesture that corresponds to the one of the finger-swipe command or the finger-drag command for controlling the UI of the wrist-wearable device, cause the UI of the wrist-wearable device to perform one or more second functions in response to the one of the finger-swipe command with motion or the finger-drag command with motion.

In some embodiments, the at least one second sensor may comprise at least one of an inertial measurement unit ("IMU") sensor or a gyroscope-based sensor, and/or the like. In some instances, the one or more second functions may comprise at least one of a scroll function or a drag function, or the like, each along a direction based on the degree of supination or pronation of a forearm connected to a wrist of the user on which the wrist-wearable device is being worn, as detected by motion of the wrist-wearable device.

In the various aspects described herein, novel finger swipe-based smart watch UI control or novel micro finger gesture-based UI control for wrist-wearable device is provided. This allows for single-handed control of the UI of the wrist-wearable device, by using micro-gestures of the fingers on the arm on which the wrist-wearable device is worn, with the biosensors (in some cases, in conjunction with sound/motion transducers (e.g., microphones, etc.) and/or IMU sensors) to monitor, track, and identify such micro-gestures. That is, compared with screen touching, such gestures allow users to control the smart watch with only one hand that wears the device. With sound/motion transducers (e.g., microphones, etc.) or biosensors, like PPG or EMG, mounted on smart watches, the algorithms can have more reliable inputs for finger gesture recognition, which is very challenging for the IMU data only solution. Compared with twist gesture, finger gesture is more natural and not quite noticeable in public spaces. The solution, according to the various embodiments, is to detect the user's finger movement between the index fingertip and the thumb fingertip to replace the swipe up and down gesture on the touch screen for the UI functions (such as page navigation, or the like).

These and other aspects of the system and method for implementing novel finger swipe-based smart watch UI control or novel micro finger gesture-based UI control for wrist-wearable device are described in greater detail with respect to the figures.

The following detailed description illustrates a few embodiments in further detail to enable one of skill in the art to practice such embodiments. The described examples are provided for illustrative purposes and are not intended to limit the scope of the invention.

In the following description, for the purposes of explanation, numerous details are set forth in order to provide a thorough understanding of the described embodiments. It will be apparent to one skilled in the art, however, that other embodiments of the present invention may be practiced without some of these details. In other instances, some structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments as described herein-while embodying (in some cases) software products, computer-performed methods, and/or computer systems-represent tangible, concrete improvements to existing technological areas, including, without limitation, wrist-wearable device technology, gesture control technology, gesture control technology for wrist-wearable devices, biosensor technology for gesture control, motion tracking technology for gesture control, user interface ("UI") control technology, UI control technology for wrist-wearable devices, and/or the like. In other aspects, some embodiments can improve the functioning of user equipment or systems themselves (e.g., wrist-wearable devices, gesture control systems, gesture control systems for wrist-wearable devices, biosensor systems for gesture control, motion tracking systems for gesture control, UI control systems, UI control systems for wrist-wearable devices, etc.), for example, by analyzing, using a computing system, first sensor data to identify micro-gestures of a finger of a user compared with a plurality of predetermined micro-gestures, the first sensor data being received from at least one first sensor disposed on a wrist-wearable device when the wrist-wearable device is being worn by the user, the at least one first sensor being configured to detect micro-gestures of the finger of the user without any fingers of the user touching the wrist-wearable device; in response to identifying a first micro-gesture of the finger of the user in the first sensor data, determining, using the computing system, whether the first micro-gesture corresponds to one of a finger-swipe command or a finger-drag command for controlling a UI of the wrist-wearable device; and based on a determination that the first micro-gesture corresponds to one of a finger-swipe command or a finger-drag command for controlling the UI of the wrist-wearable device, causing, using the computing system, the UI of the wrist-wearable device to perform one or more first functions in response to the one of the finger-swipe command or the finger-drag command; and/or the like.

In particular, to the extent any abstract concepts are present in the various embodiments, those concepts can be implemented as described herein by devices, software, systems, and methods that involve novel functionality (e.g., steps or operations), such as, identifying micro-gestures of fingers connected to a wrist on which a wrist-wearable device is worn and using the identified micro-gestures as command inputs for controlling the UI on the wrist-wearable device, and/or the like, to name a few examples, that extend beyond mere conventional computer processing operations. These functionalities can produce tangible results outside of the implementing computer system, including, merely by way of example, an optimized wrist-wearable device that allows for single-handed control of the UI of the wrist-wearable device, by using micro-gestures of the fingers on the arm on which the wrist-wearable device is worn that are detected and identified using biosensors (in some cases, in conjunction with sound/motion transducers (e.g., microphones, etc.) and/or IMU sensors) to monitor, track, and identify such micro-gestures, at least some of which may be observed or measured by users and/or wrist-wearable device manufacturers.

Some Embodiments

We now turn to the embodiments as illustrated by the drawings. FIGS. 1-5 illustrate some of the features of the method, system, and apparatus for implementing user interface ("UI") controls, and, more particularly, to methods, systems, and apparatuses for implementing novel finger swipe-based smart watch UI control or novel micro finger gesture-based UI control for wrist-wearable device, as referred to above. The methods, systems, and apparatuses illustrated by FIGS. 1-5 refer to examples of different embodiments that include various components and steps, which can be considered alternatives or which can be used in conjunction with one another in the various embodiments. The description of the illustrated methods, systems, and apparatuses shown in FIGS. 1-5 is provided for purposes of illustration and should not be considered to limit the scope of the different embodiments.

With reference to the figures, FIG. 1 is a schematic diagram illustrating a system 100 for implementing novel micro finger gesture-based user interface ("UI") control for wrist-wearable device, in accordance with various embodiments.

In the non-limiting embodiment of FIG. 1, system 100 may comprise a wrist-wearable device 105 that is configured to be worn on a wrist of a user 110. In some cases, the wrist-wearable device 105 may include, but is not limited to, one of a smart watch, a wrist-wearable display device, or other wrist-wearable user device, and/or the like. Wrist-wearable device 105 may include, without limitation, computing system(s) 115, one or more first sensors 120, one or more second sensors 125, display screen 130, and communications system 135, and/or the like. According to some embodiments, a UI 140 may be displayed or presented on display screen 130.

In some embodiments, computing system 115 may include, without limitation, at least one of one or more processors on the wrist-wearable device (e.g., processor(s)

115a, or the like), one or more processors on a mobile device that is communicatively coupled with the wrist-wearable device (e.g., processor (not shown) on mobile device 145 that is communicatively coupled with wrist-wearable device 105 via communications system 135 (as denoted in FIG. 1 by the lightning bolt symbol between mobile device 145 and communications system 135), or the like), a signal processing system (e.g., signal processing system 115b, or the like), an artificial intelligence ("AI") system (e.g., AI system 115c, or the like), or other computing system(s) 115d, and/or the like. In some cases, the AI system 115c and/or the other computing system(s) 115d may include, but is not limited to, a machine learning system, a deep learning system, a neural network, a convolutional neural network ("CNN"), or a fully convolutional network ("FCN"), and/or the like.

Merely by way of example, in some cases, display device 130 may include, but is not limited to, at least one of a touchscreen display device, a projection-based display device, a holographic display device, and/or the like. In some instances, the communications system 135 may include wireless communications devices capable of communicating using protocols including, but not limited to, at least one of Bluetooth™ communications protocol, WiFi communications protocol, or other 802.11 suite of communications protocols, ZigBee communications protocol, Z-wave communications protocol, or other 802.15.4 suite of communications protocols, cellular communications protocol (e.g., 3G, 4G, 4G LTE, 5G, etc.), or other suitable communications protocols, and/or the like. In some cases, mobile device 145 may include, without limitation, one of a smart phone, a tablet computer, a laptop computer, or a portable gaming device, and/or the like.

According to some embodiments, the one or more first sensors 120 may each include at least one biosensor. In some instances, the at least one biosensor may include, without limitation, at least one of one or more photoplethysmography ("PPG") sensors, one or more electromyography ("EMG") sensors, one or more sound transducers, or one or more motion transducers, and/or the like, each configured to detect biological characteristics that correspond to motion of soft tissue in or near a wrist of the user on which the wrist-wearable device is being worn. In some cases, the soft tissue may include, but is not limited to, at least one of one or more muscles, one or more tendons, or one or more blood vessels, and/or the like, in or near the wrist of the user. In some cases, the one or more PPG sensors may be configured to optically detect blood volume changes in the one or more blood vessels below skin tissue at or near the wrist of the user corresponding to finger movement of the user. In some instances, the one or more EMG sensors may be configured to detect electrical activity of the one or more muscles at or near the wrist of the user corresponding to finger movement of the user. In some cases, the one or more sound transducers (in some cases, including, but not limited to, a microphone, or the like) may be configured to detect sounds within a body of the user corresponding to finger movement of the user. In some instances, the one or more motion transducers (in some cases, including, but not limited to, a microphone, or the like) may be configured to detect motion of the one or more muscles, the one or more tendons, and the one or more blood vessels corresponding to finger movement of the user.

Merely by way of example, in some cases, the one or more second sensors 125 may each include, but is not limited to, at least one of an inertial measurement unit ("IMU") sensor(s) or a gyroscope-based sensor(s), or similar sensor(s) and/or the like.

In operation, computing system(s) 115, processor(s) 115a, signal processing system 115b, AI system 115c, other computing system(s) 115d, and/or mobile device 145, or the like (collectively, "computing system" or the like) may analyze first sensor data to identify micro-gestures of a finger of a user (e.g., user 110, or the like) compared with a plurality of predetermined micro-gestures, the first sensor data being received from at least one first sensor (e.g., first sensor(s) or biosensor(s) 120, or the like) disposed on a wrist-wearable device (e.g., wrist-wearable device 105, or the like) when the wrist-wearable device is being worn by the user, the at least one first sensor being configured to detect micro-gestures of the finger of the user without any fingers of the user touching the wrist-wearable device. In response to identifying a first micro-gesture of the finger of the user in the first sensor data, the computing system may determine whether the first micro-gesture corresponds to one of a finger-swipe command or a finger-drag command for controlling a UI (e.g., UI 140, or the like) of the wrist-wearable device. Based on a determination that the first micro-gesture corresponds to one of a finger-swipe command or a finger-drag command for controlling the UI of the wrist-wearable device, the computing system may cause the UI of the wrist-wearable device to perform one or more first functions in response to the one of the finger-swipe command or the finger-drag command.

In some embodiments, the finger-swipe command may include, without limitation, one of a swipe-up command, a swipe-down command, a swipe-left command, or a swipe-right command, and/or the like. In some instances, the one or more first functions may include, but is not limited to, one of a scroll-up function, a scroll-down function, a scroll-left function, or a scroll-right function, and/or the like, for navigating through displayed content on the UI that may be displayed on a display screen of the wrist-wearable device. In some cases, the finger-swipe command may include, without limitation, one of a lifting of a finger or a lowering of the finger, each relative to a relaxed pose of fingers of a hand of the user and each performed at moderate speed.

According to some embodiments, the finger-drag command may include, but is not limited to, one of a drag-up command, a drag-down command, a drag-left command, or a drag-right command, and/or the like. In some cases, the one or more first functions may include, without limitation, one of a move-up function, a move-down function, a move-left function, or a move-right function, and/or the like, for navigating through displayed content on the UI that may be displayed on a display screen of the wrist-wearable device. In some instances, the finger-drag command may include, but is not limited to, one of a lifting of a finger or a lowering of the finger, each relative to a relaxed pose of fingers of a hand of the user and each performed at slow speed.

In some embodiments, the computing system may analyze second sensor data to detect motion (including rotation and/or linear motion, etc.) of the wrist-wearable device with respect to at least one axis of rotation among three axes of rotation, the second sensor data being received from at least one second sensor (e.g., second sensor(s) or IMU sensor(s) 125, or the like) disposed on the wrist-wearable device when the wrist-wearable device is being worn by the user. In response to detecting motion of the wrist-wearable device with respect to at least one axis of rotation in the second sensor data, the computing system may determine whether the detected motion of the wrist-wearable device coincides, and operates in conjunction, with the first micro-gesture that corresponds to the one of the finger-swipe command or the finger-drag command for controlling the UI of the wrist-wearable device. Based on a determination that the detected motion of the wrist-wearable device coincides, and operates in conjunction, with the first micro-gesture that corresponds to the one of the finger-swipe command or the finger-drag command for controlling the UI of the wrist-wearable device, the computing system may cause the UI of the wrist-wearable device to perform one or more second functions in response to the one of the finger-swipe command with motion or the finger-drag command with motion.

In some cases, the one or more second functions may comprise at least one of a scroll function or a drag function, or the like, each along a direction based on the degree of supination or pronation of a forearm connected to a wrist of the user on which the wrist-wearable device is being worn, as detected by motion of the wrist-wearable device.

Compared with screen touching, the micro-gestures (described herein) allow users to control the smart watch with only one hand that wears the wrist-wearable device. With sound/motion transducers (e.g., microphones, etc.) or biosensors, like PPG or EMG, mounted on smart watches, the algorithms can have more reliable inputs for finger gesture recognition, which is very challenging for the IMU data only solution. Compared with twist gesture, finger gesture is more natural and not quite noticeable in public spaces. The solution, according to the various embodiments, is to detect the user's finger movement between the index fingertip and the thumb fingertip to replace the swipe up and down gesture on the touch screen for the UI functions (such as page navigation, or the like). The various embodiments fully utilize the IMU, microphone (or sound/motion transducers, and/or biosensors to detect the micro movement between index finger and thumb, and then use such motion detection to output a continuous value to mimic the output of swipe up/down gesture. FIGS. 2A-3F depict the finger and hand positions and poses for performing swipe-based or drag-based gestures, and examples of how such gestures may be used to control UIs of wrist-wearable devices.

These and other functions of the system 100 (and its components) are described in greater detail below with respect to FIGS. 2-4.

FIGS. 2A-2F (collectively, "FIG. 2") are schematic diagrams illustrating various non-limiting examples 200 and 200' of swipe-based gesture (or finger-swipe) command (as shown in FIGS. 2A-2C) and drag-based gesture (or finger-drag) command (as shown in FIGS. 2D-2F), respectively, in accordance with various embodiments.

Swipe-based gesture (or finger-swipe) command is shown with reference to the non-limiting example 200 of FIGS. 2A-2C. As depicted in FIG. 2A, a user may start from a relaxed pose of fingers (also referred to herein as "initial pose"), which may be defined by the hand 205 of the user with the fingers (e.g., five fingers) naturally spread out and released or relaxed (i.e., without muscle tension to straighten the fingers nor to curl them (e.g., as in a fist, or the like), and the like). For the swipe-up command (as shown in FIG. 2B), a finger 210 (such as, but not limited to, the index finger, or the like) may be lifted, e.g., at a moderate speed (as depicted in FIG. 2B by the medium length curved arrow 215a; herein moderate speed may refer to a speed that is greater than a slow, deliberate shift in positioning of the finger, or the like), from the initial or relaxed pose (or the lowered position in FIG. 2C), relative to the other fingers, which remain in the initial or relaxed pose. In some cases, finger lifting may be performed at a fast speed (e.g., as defined by visual blurring of the fingers due to speed of movement, or the like). For the swipe-down command (as shown in FIG. 2C), the finger 210 may be lowered, e.g., at a moderate speed (as depicted in FIG. 2C by the medium length curved arrow 215b), from either the initial or relaxed pose or the lifted position (as shown in FIG. 2B), relative to the other fingers, which remain in the initial or relaxed pose. In some cases, finger lowering may be performed at a fast speed.

According to some embodiments, from the initial pose, if the user lifts the index finger (as shown in FIG. 2B), the computing system identifies such micro-gesture as a swipe up command. Conversely, from the initial pose, if the user pulls down the index finger (as shown in FIG. 2C), the computing system identifies such micro-gesture as a swipe down command. Taking page navigation functionality as an example, the user could use an activation gesture, like a pinch command, to open the page. Then, the user can pull down the index finger to trigger the swipe down function to navigate down the page. If the user lifts the index finger above the initial pose, such gesture will trigger the swipe up function.

Drag-based gesture (or finger-drag) command is shown with reference to the non-limiting example 200' of FIGS. 2D-2F. As depicted in FIG. 2D, a user may start from the initial or relaxed pose of fingers, similar to that in FIG. 2A as described above. For the drag-up command (as shown in FIG. 2E), a finger 210 (such as, but not limited to, the index finger, or the like) may be lifted, e.g., at a slow speed (as depicted in FIG. 2E by the short, curved arrow 220a; herein slow speed may refer to a speed that is slower than the moderate speed described above, or the like), from the initial or relaxed pose (or the lowered position in FIG. 2F), relative to the other fingers, which remain in the initial or relaxed pose. For the drag-down command (as shown in FIG. 2F), the finger 210 may be lowered, e.g., at a slow speed (as depicted in FIG. 2F by the short, curved arrow 220b), from either the initial or relaxed pose or the lifted position (as shown in FIG. 2E), relative to the other fingers, which remain in the initial or relaxed pose.

In the various embodiments, the first sensor(s) or biosensor(s) (e.g., first sensor(s) or biosensor(s) 120 of FIG. 1, or the like) that is disposed in or on the wrist-wearable device (e.g., wrist-wearable device 105 of FIG. 1, or the like) may be used, when worn on the wrist of the user, to track, monitor, and/or identify micro-gestures, such as micro-gestures resulting from, or associated with, the swipe-up command (as shown in FIG. 2B), the swipe-down command (as shown in FIG. 2C), the drag-up command (as shown in FIG. 2E), and/or the drag-down command (as shown in FIG. 2F), or the like.

In the case that the UI (e.g., UI 140 of FIG. 1, or the like) provides only one-dimension along which a user may scroll or drag within the UI (regardless of whether or not the wrist-wearable device includes the second sensor(s) or IMU sensor(s) (e.g., second sensor(s) or IMU sensor(s) 125 of FIG. 1, or the like)), then the lifting (as shown in FIGS. 2B and 2E) and the lowering (as shown in FIGS. 2C and 2F) of finger 210 may be identified as micro-gestures that result in the computing system (e.g., computing system(s) 115 of FIG. 1, or the like) causing the UI to perform one of scrolling or dragging along a first direction (in response to the finger lifting of FIGS. 2B and 2E, respectively) or to scroll or drag along a second direction (in response to the finger lowering of FIGS. 2C and 2F, respectively). For example, if the UI only provides vertical movement, then the first direction may result in the computing system causing the UI to perform one of a scroll-up function or a drag-up function, while the second direction may result in the computing system causing the UI to perform one of a scroll-down function or a drag-down function, or the like. Similarly, if the UI only provides horizontal movement, then the first direction may result in the computing system causing the UI to perform one of a scroll-left function or a drag-left function (if using the left hand; or a scroll-right function or a drag-right function if using the right hand), while the second direction may result in the computing system causing the UI to perform one of a scroll-right function or a drag-right function (if using the left hand; or a scroll-left function or a drag-left function if using the right hand), or the like.

In the case that the UI (e.g., UI 140 of FIG. 1, or the like) provides two-dimensions along which a user may scroll or drag within the UI, and in the case that the wrist-wearable device includes the second sensor(s) or IMU sensor(s) (e.g., second sensor(s) or IMU sensor(s) 125 of FIG. 1, or the like), then the lifting (as shown in FIGS. 2B and 2E) and the lowering (as shown in FIGS. 2C and 2F) of finger 210 in conjunction with motion of the user's wrist (as detected by the second sensor(s) or IMU sensor(s)) may be identified as micro-gestures that result in the computing system (e.g., computing system(s) 115 of FIG. 1, or the like) causing the UI to perform one of scrolling or dragging along a direction based on the degree of supination or pronation of a forearm connected to a wrist of the user on which the wrist-wearable device is being worn, as detected by the second sensor(s) or IMU sensor(s) that tracks motion of the wrist-wearable device. Herein, supination of the forearm may refer to rotation of the forearm such that the ventral side of the forearm (or palm) is facing forward and/or upward relative to a sitting or standing position of the body of the user when the user's arm is hanging by the users side or when the forearm is lifted from the arm hanging position (regardless of whether the fingers are spread in an open hand or are closed in a fist), while pronation of the forearm may refer to rotation of the forearm such that the ventral side of the forearm (or palm) is facing backward and/or downward relative to a sitting or standing position of the body of the user when the user's arm is hanging by the users side or when the forearm is lifted from the arm hanging position (regardless of whether the fingers are spread in an open hand or are closed in a fist), and a neutral position of the forearm may refer to rotation of the forearm such that the ventral side of the forearm (or palm) is facing toward the sagittal or median plane, which divides the body into the right and left parts along the midline of the body, and is partway or halfway between the supinated and pronated positions.

In a non-limiting example, if the forearm is pronated (or fully pronated), then the lifting (as shown in FIGS. 2B and 2E) and the lowering (as shown in FIGS. 2C and 2F) of finger 210 may be identified as micro-gestures that result in the computing system (e.g., computing system(s) 115 of FIG. 1, or the like) causing the UI to perform one of scrolling or dragging along the vertical direction (i.e., in the up or down direction, similar to the one dimensional vertical movement embodiment described above), regardless of whether the user's elbow is straight, bent with forearm beside the torso, or bent with forearm in front of the torso. Similarly, if the forearm is in the neutral position such that the ventral side of the forearm (or palm) is facing toward the sagittal or median plane, then the lifting (as shown in FIGS. 2B and 2E) and the lowering (as shown in FIGS. 2C and 2F) of finger 210 may be identified as micro-gestures that result in the computing system (e.g., computing system(s) 115 of FIG. 1, or the like) causing the UI to perform one of scrolling or dragging along the horizontal direction (i.e., in the left or right direction, similar to the one dimensional horizontal movement embodiment described above), regardless of whether the user's elbow is straight, bent with forearm beside the torso, or bent with forearm in front of the torso. If the forearm is between the supinated and pronated positions (but not at either the pronated or neutral positions), then the lifting (as shown in FIGS. 2B and 2E) and the lowering (as shown in FIGS. 2C and 2F) of finger 210 may be identified as micro-gestures that result in the computing system (e.g., computing system(s) 115 of FIG. 1, or the like) causing the UI to perform one of scrolling or dragging along a diagonal direction based on the degree of rotation between the supinated and pronated positions, regardless of whether the user's elbow is straight, bent with forearm beside the torso, or bent with forearm in front of the torso.

For use with a display screen of the wrist-wearable device, which is being used to track finger gestures, and for scrolling or dragging along the horizontal direction or along the diagonal direction, rotation of the forearm to a position other than the pronated position (perhaps together with one of a pinch-based gesture command, a tap-based gesture command, or a double-tap-based gesture command, or the like) may set the direction of scroll or drag, followed immediately by lifting and lowering of the finger to cause the UI to perform one of scrolling or dragging along said set direction. Herein, the pinch-based gesture command may include the thumb and forefinger touching or pressing together with minimal or no movement in the other fingers of the hand (not shown). In some embodiments, setup of the functionalities of the wrist-wearable device may include, for each individual user, calibration to set at least one of: the range of rotation between the supinated and the pronated position, the neutral position, the finger lift characteristics corresponding to the swipe-up command, the finger lower characteristics corresponding to the swipe-down command, the finger lift characteristics corresponding to the drag-up command, the finger lower characteristics corresponding to the drag-down command, left (or right) wrist on which the wrist-wearable device is typically worn, the finger lift characteristics corresponding to the swipe-left (or swipe-right) command, the finger lower characteristics corresponding to the swipe-right (or swipe-left) command, the finger lift characteristics corresponding to the drag-left (or drag-right) command, the finger lower characteristics corresponding to the drag-right (or drag-left) command, finger gesture characteristics corresponding to the pinch-based command, finger gesture characteristics corresponding to the tap-based command, finger gesture characteristics corresponding to the double-tap-based command, and/or the like.

In some embodiments, a machine learning system (e.g., AI system 115*c* or other computing system(s) 115*d*, or the like) may be used to further enhance operation of the wrist-wearable device by learning and fine-tuning the detection of the micro-gestures, instances of intended gesture control by the user compared with regular movement not intended to be gesture control movements, and/or the like, that adapt to use by the user over time, or the like.

Figure 3A:
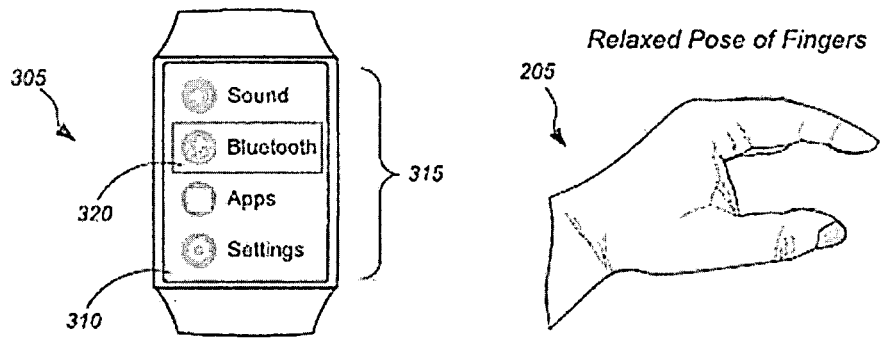
FIGS. 3A-3F are schematic diagrams illustrating various non-limiting examples of the use of swipe-based gesture (or finger-swipe) command and drag-based gesture (or finger-drag) command for controlling UI of a wrist-wearable device, during implementation of novel micro finger gesture-based UI control for wrist-wearable device, in accordance with various embodiments.
Figure 3B:
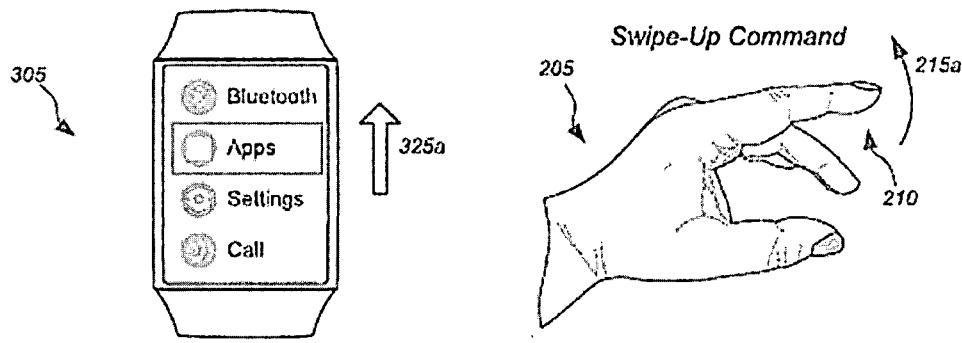
Figure 3C:
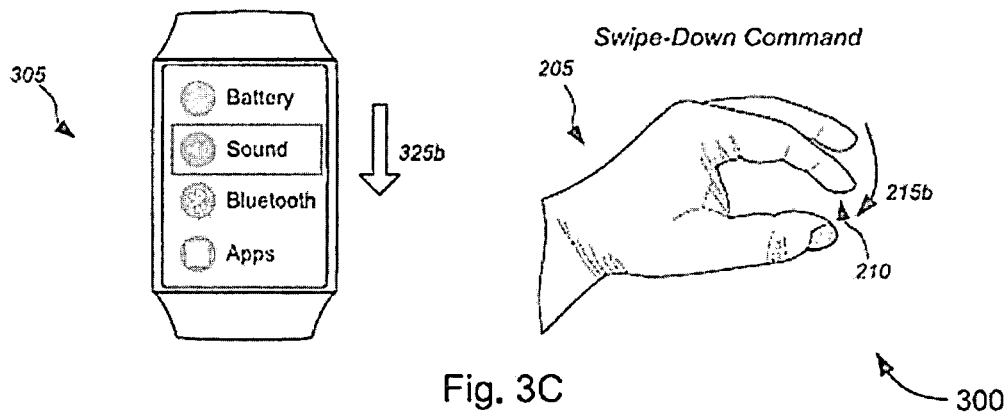
Figure 3D:
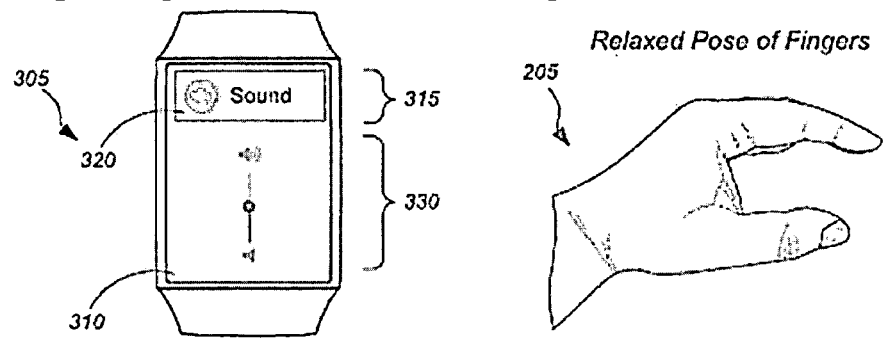
Figure 3E:
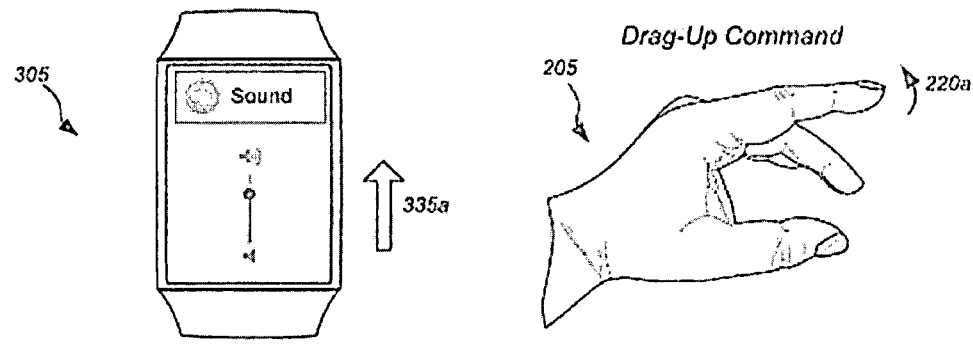
Figure 3F:
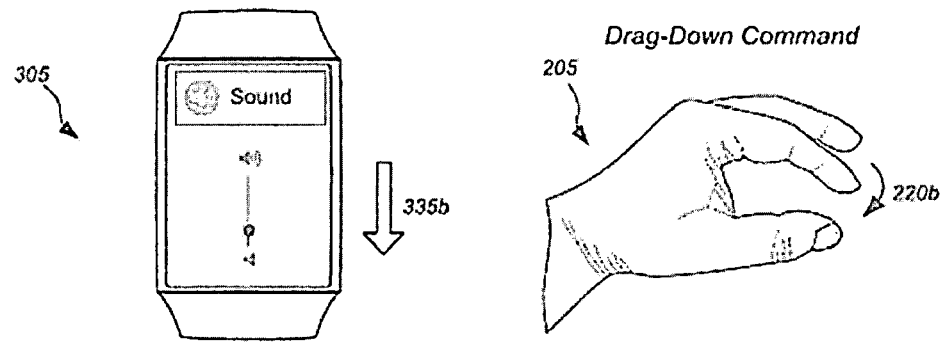
Figure 4:
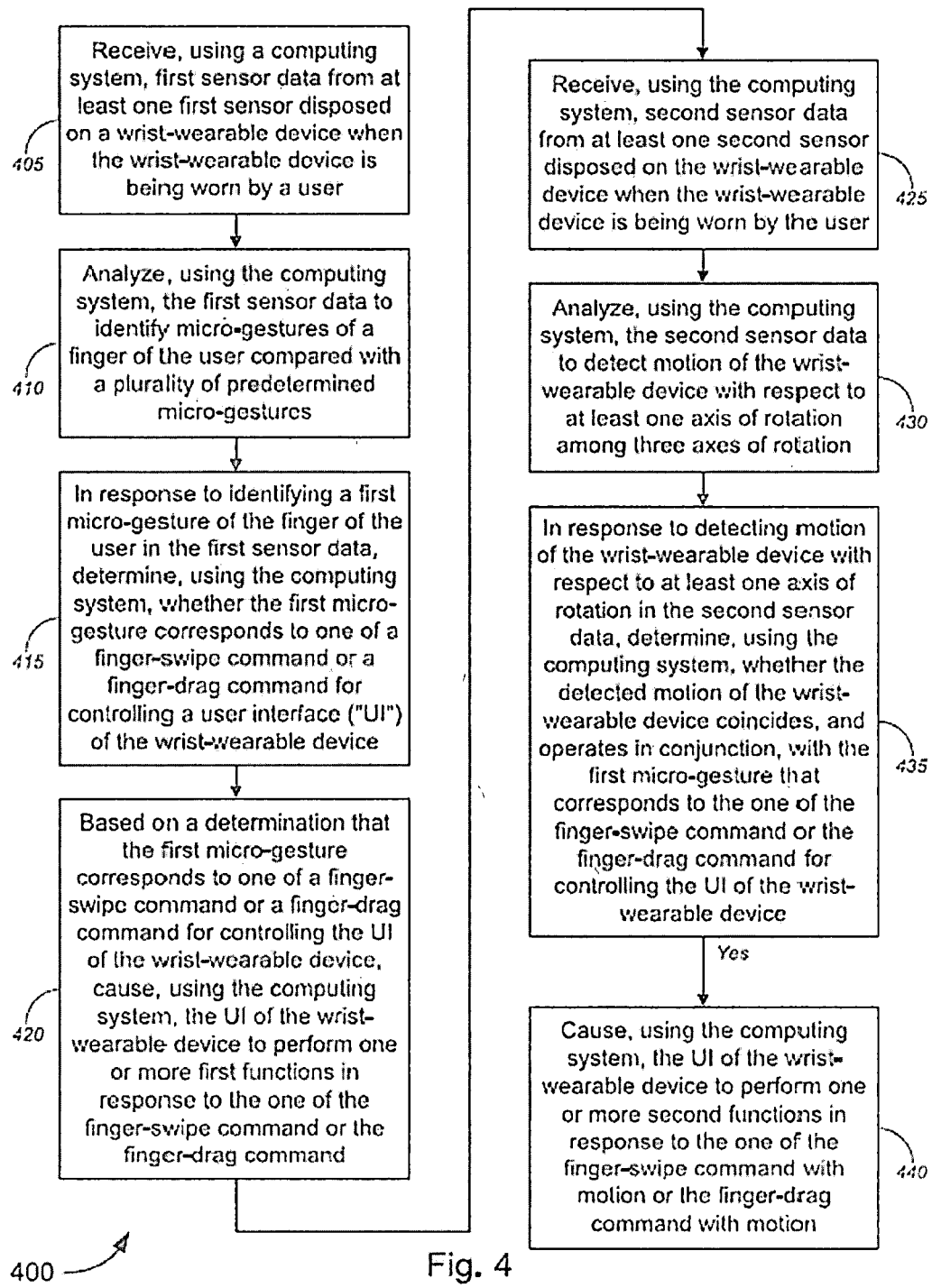
FIG. 4 is a flow diagram illustrating a method for implementing novel micro finger gesture-based UI control for wrist-wearable device, in accordance with various embodiments.

These and other functions of the example(s) examples 200 and 200' (and their components) are described in greater detail herein with respect to FIGS. 1, 3, and 4.

FIGS. 3A-3F (collectively, "FIG. 3") are schematic diagrams illustrating various non-limiting examples 300 and 300' of the use of swipe-based gesture (or finger-swipe) command and drag-based gesture (or finger-drag) command for controlling UI of a wrist-wearable device, respectively, during implementation of novel micro finger gesture-based UI control for wrist-wearable device, in accordance with various embodiments.

The use of swipe-based gesture (or finger-swipe) command for controlling a UI of a wrist-wearable device is shown with reference to the non-limiting example 300 of FIGS. 3A-3C. In FIGS. 3A-3C, the relaxed or initial pose of fingers of hand 205 of the user, the lifting of finger 210 (as depicted in FIG. 3B by the medium length curved arrow 215a denoting finger lifting at a moderate speed), and the lowering of finger 210 (as depicted in FIG. 3C by the medium length curved arrow 215b denoting finger lowering at a moderate speed) are similar to, if not identical to, the corresponding gesture-based commands as shown and described with respect to FIGS. 2A-2C. As shown in the non-limiting example 300 of FIGS. 3A-3C, the wrist-wearable device 305 (in this case, a smartwatch or watch-based wrist-wearable device, or the like) may include a UI 310 on which may be displayed one or more items 315 (including, but not limited to, objects, icons, menu items, or the like), and on which may be displayed a selection field or highlighting field 320.

In response to the swipe-up command (as shown in FIG. 3B), as monitored, tracked, or identified by the first sensor(s) or biosensor(s) (e.g., the first sensor(s) or biosensor(s) 120 of FIG. 1, or the like) that is disposed in or on the wrist-wearable device (e.g., wrist-wearable device 105 of FIG. 1, or the like), the computing system (e.g., computing system 115 of FIG. 1, or the like) may cause the UI 310 to perform a scroll-based function, or the like. In this case, the UI 310 may perform a scroll-up function along the vertical direction denoted by arrow 325a, in which the menu items 320 depicted in FIG. 3 would move or cycle upward (in this case, with the menu items corresponding to "Sound," "Bluetooth," "Apps," and "Setting" as shown in FIG. 3A moving or cycling upward, resulting in the menu item corresponding to "Sound" moving beyond the displayed UI 310 and the menu item corresponding to "Call" moving within the displayed UI 310, with menu items corresponding to "Bluetooth," "Apps," and "Setting" shifting upwards, and with selection field 320 highlighting the menu item corresponding to "Apps" instead of the menu item corresponding to "Bluetooth," or the like).

Similarly, in response to the swipe-down command (as shown in FIG. 3C), as monitored, tracked, or identified by the first sensor(s) or biosensor(s), the computing system may cause the UI 310 to perform a scroll-based function, or the like. In this case, the UI 310 may perform a scroll-down function along the vertical direction denoted by arrow 325b, in which the menu items 320 depicted in FIG. 3 would move or cycle downward (in this case, with the menu items corresponding to "Sound," "Bluetooth," "Apps," and "Setting" as shown in FIG. 3A moving or cycling downward, resulting in the menu item corresponding to "Settings" moving beyond the displayed UI 310 and the menu item corresponding to "Battery" moving within the displayed UI 310, with menu items corresponding to "Sound," "Bluetooth," and "Apps," shifting downwards, and with selection field 320 highlighting the menu item corresponding to "Sound" instead of the menu item corresponding to "Bluetooth," or the like).

The use of drag-based gesture (or finger-drag) command for controlling a UI of a wrist-wearable device is shown with reference to the non-limiting example 300' of FIGS. 3D-3F. In FIGS. 3D-3F, the relaxed or initial pose of fingers of hand 205 of the user, the lifting of finger 210 (as depicted in FIG. 3E by the short length curved arrow 220a denoting finger lifting at a slow speed), and the lowering of finger 210 (as depicted in FIG. 3F by the short length curved arrow 220b denoting finger lowering at a slow speed) are similar to, if not identical to, the corresponding gesture-based commands as shown and described with respect to FIGS. 2D-2F. As shown in the non-limiting example 300' of FIGS. 3D-3F, the wrist-wearable device 305 (in this case, a smartwatch or watch-based wrist-wearable device, or the like) may include a UI 310 on which may be displayed a selected item 315 (including, but not limited to, objects, icons, menu items, or the like) within a selection or highlighting field 320, and graphical icons 330 related to the selected item 315 (in this case, a slider bar for volume control corresponding to the "Sound" menu item, or the like).

In response to the drag-up command (as shown in FIG. 3E), as monitored, tracked, or identified by the first sensor(s) or biosensor(s) (e.g., the first sensor(s) or biosensor(s) 120 of FIG. 1, or the like) that is disposed in or on the wrist-wearable device (e.g., wrist-wearable device 105 of FIG. 1, or the like), the computing system (e.g., computing system 115 of FIG. 1, or the like) may cause the UI 310 to perform a drag-based function, or the like. In this case, the UI 310 may perform a drag-up function along the vertical direction denoted by arrow 335a, in which the graphical icons 330 are caused to be slid or dragged upward (in this case, the slider bar for volume control corresponding to the "Sound" menu item may be caused to slide or be dragged upward along the direction of arrow 335a, thereby increasing the volume output by the wrist-wearable device or output by a communicatively coupled sound presentation device (e.g., speakers on the wrist-wearable device 305, speakers on a communicatively coupled external speaker system, or speakers on a user device that is communicatively coupled with the wrist-wearable device, or the like), or the like).

Likewise, in response to the drag-down command (as shown in FIG. 3F), as monitored, tracked, or identified by the first sensor(s) or biosensor(s), the computing system may cause the UI 310 to perform a drag-based function, or the like. In this case, the UI 310 may perform a drag-down function along the vertical direction denoted by arrow 335b, in which the graphical icons 330 are caused to be slid or dragged downward (in this case, the slider bar for volume control corresponding to the "Sound" menu item may be caused to slide or be dragged downward along the direction of arrow 335b, thereby decreasing the volume output by the wrist-wearable device or output by a communicatively coupled sound presentation device (e.g., speakers on the wrist-wearable device 305, speakers on a communicatively coupled external speaker system, or speakers on a user device that is communicatively coupled with the wrist-wearable device, or the like), or the like).

Although FIG. 3 depicts one dimensional vertical movement (similar to that described above with respect to FIG. 2), the various embodiments are not so limited, and one dimensional horizontal movement may be implemented if the UI provides for horizontal scrolling or dragging, or two dimensional movement may be implemented if the UI provides for one or more of two-dimensional horizontal scrolling or dragging, two-dimensional vertical scrolling or dragging, or two-dimensional diagonal scrolling or dragging (as described above with respect to FIG. 2), or the like. Although FIG. 3 depicts a smart-watch or watch-based wrist-wearable device, the various embodiments are not so limited, and the wrist-wearable device may include any suitable form factor—with a display (whether touchscreen or non-touchscreen), sensors, and the functionalities described in accordance with the various embodiments— that may be worn on a wrist of a user. Although FIG. 3 depicts particular UIs 310, items 315, selection or highlighting fields 320, graphical icons 330, slidable/scrollable/draggable objects, and/or the like, the various embodiments are not so limited, and any suitable UIs, items (including, any suitable objects, icons, menu items, or the like), selection or highlighting fields, graphical icons, slidable/scrollable/draggable objects, and/or the like, may be used as desired or as appropriate.

These and other functions of the example(s) examples 300 and 300' (and their components) are described in greater detail herein with respect to FIGS. 1, 2, and 4.

FIG. 4 is a flow diagram illustrating a method 400 for implementing novel micro finger gesture-based UI control for wrist-wearable device, in accordance with various embodiments.

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems, examples, or embodiments 100, 200, 200', 300, and 300' of FIGS. 1, 2A-2C, 2D-2F, 3A-3C, and 3D-3F, respectively (or components thereof), such methods may also be implemented using any suitable hardware (or software) implementation. Similarly, while each of the systems, examples, or embodiments 100, 200, 200', 300, and 300' of FIGS. 1, 2A-2C, 2D-2F, 3A-3C, and 3D-3F, respectively (or components thereof), can operate according to the method 400 illustrated by FIG. 4 (e.g., by executing instructions embodied on a computer readable medium), the systems, examples, or embodiments 100, 200, 200', 300, and 300' of FIGS. 1, 2A-2C, 2D-2F, 3A-3C, and 3D-3F can each also operate according to other modes of operation and/or perform other suitable procedures.

In the non-limiting embodiment of FIG. 4A, method 400, at block 405, may comprise receiving, using a computing system, first sensor data from at least one first sensor disposed on a wrist-wearable device when the wrist-wearable device is being worn by a user.

In some embodiments, the computing system may include, without limitation, at least one of one or more processors on the wrist-wearable device, one or more processors on a mobile device that is communicatively coupled with the wrist-wearable device, a machine learning system, an artificial intelligence ("AI") system, a deep learning system, a neural network, a convolutional neural network ("CNN"), or a fully convolutional network ("FCN"), and/or the like. In some cases, the wrist-wearable device may include, but is not limited to, one of a smart watch, a wrist-wearable display device, or other wrist-wearable user device, and/or the like.

According to some embodiments, the at least one first sensor may include at least one biosensor. In some instances, the at least one biosensor may include, without limitation, at least one of one or more photoplethysmography ("PPG") sensors, one or more electromyography ("EMG") sensors, one or more sound transducers, or one or more motion transducers, and/or the like, each configured to detect biological characteristics that correspond to motion of soft tissue in or near a wrist of the user on which the wrist-wearable device is being worn. In some cases, the soft tissue may include, but is not limited to, at least one of one or more muscles, one or more tendons, or one or more blood vessels, and/or the like, in or near the wrist of the user. In some cases, the one or more PPG sensors may be configured to optically detect blood volume changes in the one or more blood vessels below skin tissue at or near the wrist of the user corresponding to finger movement of the user. In some instances, the one or more EMG sensors may be configured to detect electrical activity of the one or more muscles at or near the wrist of the user corresponding to finger movement of the user. In some cases, the one or more sound transducers may be configured to detect sounds within a body of the user corresponding to finger movement of the user. In some instances, the one or more motion transducers may be configured to detect motion of the one or more muscles, the one or more tendons, and the one or more blood vessels corresponding to finger movement of the user.

At block 410, method 400 may comprise analyzing, using the computing system, the first sensor data to identify micro-gestures of a finger of the user compared with a plurality of predetermined micro-gestures, the first sensor data being received from the at least one first sensor disposed on the wrist-wearable device when the wrist-wearable device is being worn by the user, the at least one first sensor being configured to detect micro-gestures of the finger of the user without any fingers of the user touching the wrist-wearable device.

Method 400 may further comprise, at block 415, in response to identifying a first micro-gesture of the finger of the user in the first sensor data, determining, using the computing system, whether the first micro-gesture corresponds to one of a finger-swipe command or a finger-drag command for controlling a user interface ("UI") of the wrist-wearable device.

Method 400 may further comprise, based on a determination that the first micro-gesture corresponds to one of a finger-swipe command or a finger-drag command for controlling the UI of the wrist-wearable device, causing, using the computing system, the UI of the wrist-wearable device to perform one or more first functions in response to the one of the finger-swipe command or the finger-drag command (block 420).

In some embodiments, the finger-swipe command may include, without limitation, one of a swipe-up command, a swipe-down command, a swipe-left command, or a swipe-right command, and/or the like. In some instances, the one or more first functions may include, but is not limited to, one of a scroll-up function, a scroll-down function, a scroll-left function, or a scroll-right function, and/or the like, for navigating through displayed content on the UI that may be displayed on a display screen of the wrist-wearable device. In some cases, the finger-swipe command may include, without limitation, one of a lifting of a finger or a lowering of the finger, each relative to a relaxed pose of fingers of a hand of the user and each performed at moderate speed.

According to some embodiments, the finger-drag command may include, but is not limited to, one of a drag-up command, a drag-down command, a drag-left command, or a drag-right command, and/or the like. In some cases, the one or more first functions may include, without limitation, one of a move-up function, a move-down function, a move-left function, or a move-right function, and/or the like, for navigating through displayed content on the UI that may be displayed on a display screen of the wrist-wearable device. In some instances, the finger-drag command may include, but is not limited to, one of a lifting of a finger or a lowering of the finger, each relative to a relaxed pose of fingers of a hand of the user and each performed at slow speed.

In some embodiments, method 400 may further comprise, at block 425, receiving, using the computing system, second sensor data from at least one second sensor disposed on the wrist-wearable device when the wrist-wearable device is being worn by the user. At block 430, method 400 may comprise analyzing, using the computing system, the second sensor data to detect motion of the wrist-wearable device with respect to at least one axis of rotation among three axes of rotation, the second sensor data being received from the at least one second sensor disposed on the wrist-wearable device when the wrist-wearable device is being worn by the user. Method 400, at block 435, may comprise, in response to detecting motion of the wrist-wearable device with respect to at least one axis of rotation in the second sensor data, determining, using the computing system, whether the detected motion of the wrist-wearable device coincides, and operates in conjunction, with the first micro-gesture that corresponds to the one of the finger-swipe command or the finger-drag command for controlling the UI of the wrist-wearable device. Method 400 may further comprise, based on a determination that the detected motion of the wrist-wearable device coincides, and operates in conjunction, with the first micro-gesture that corresponds to the one of the finger-swipe command or the finger-drag command for controlling the UI of the wrist-wearable device, causing, using the computing system, the UI of the wrist-wearable device to perform one or more second functions in response to the one of the finger-swipe command with motion or the finger-drag command with motion (block 440).

Merely by way of example, in some cases, the at least one second sensor may include, but is not limited to, at least one of an inertial measurement unit ("IMU") sensor or a gyroscope-based sensor, and/or the like. In some cases, the one or more second functions may include, without limitation, at least one of a scroll function or a drag function, each along a direction based on the degree of supination or pronation of a forearm connected to a wrist of the user on which the wrist-wearable device is being worn, as detected by motion of the wrist-wearable device (as described in detail above with respect to FIG. 2, or the like).

Examples of System and Hardware Implementation

Figure 5:
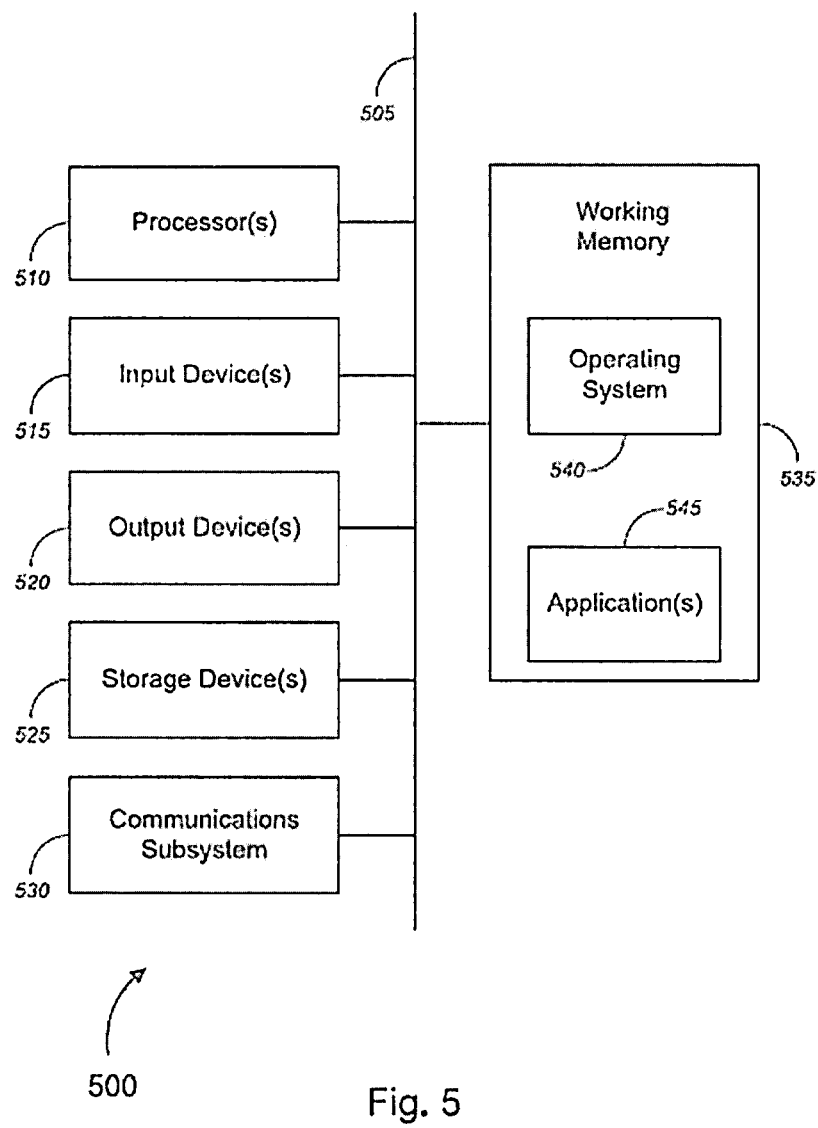
FIG. 5 is a block diagram illustrating an example of computer or system hardware architecture, in accordance with various embodiments.

FIG. 5 is a block diagram illustrating an example of computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., wrist-wearable devices 105 and 305, computing system 115, display screen 130, and mobile device 145, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., wrist-wearable devices 105 and 305, computing system 115, display screen 130, and mobile device 145, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with particular requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in some fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

While particular features and aspects have been described with respect to some embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while particular functionality is ascribed to particular system components, unless the context dictates otherwise, this functionality need not be limited to such and can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—particular features for ease of description and to illustrate some aspects of those embodiments, the various components and/or features described herein with respect to a particular embodiment can be substituted, added and/or subtracted from among other described embodiments, unless the context dictates otherwise. Consequently, although several embodiments are described above, it will be appreciated that the invention is intended to cover all modifications and equivalents within the scope of the following claims.

What is claimed is:

1. A method, comprising:
analyzing, using a computing system, first sensor data to identify micro-gestures of a finger of a user compared with a plurality of predetermined micro-gestures, the first sensor data being received from at least one first sensor disposed on a wrist-wearable device when the wrist-wearable device is being worn on a wrist of the user, the at least one first sensor being configured to detect the micro-gestures of the finger of the user without any fingers of the user touching the wrist-wearable device, the finger of the user being on the wrist of the user;

in response to identifying a first micro-gesture of the finger of the user in the first sensor data, determining, using the computing system, whether the first micro-gesture corresponds to one of a finger-swipe command or a finger-drag command for controlling a user interface ("UI") of the wrist-wearable device; and based on a determination that the first micro-gesture corresponds to one of the finger-swipe command or the finger-drag command for controlling the UI of the wrist-wearable device, causing, using the computing system, the UI of the wrist-wearable device to perform one or more first functions in response to the one of the finger-swipe command or the finger-drag command;

wherein the first sensor data comprises biological characteristics that correspond to motion of soft tissue in or near the wrist of the user on which the wrist-wearable device is being worn;

the method further comprising:

analyzing, using the computing system, second sensor data to detect motion of the wrist-wearable device with respect to at least one axis of rotation among three axes of rotation, the second sensor data being received from:

at least one second sensor disposed on the wrist-wearable device when the wrist-wearable device is being worn by the user;

in response to detecting the motion of the wrist-wearable device with respect to the at least one axis of rotation in the second sensor data, determining, using the computing system, whether the detected motion of the wrist-wearable device coincides, and operates in conjunction, with the first micro-gesture that corresponds to the one of the finger-swipe command or the finger-drag command for controlling the UI of the wrist-wearable device; and based on a determination that the detected motion of the wrist-wearable device coincides, and operates in conjunction, with the first micro-gesture that corresponds to the one of the finger-swipe command or the finger-drag command for controlling the UI of the wrist-wearable device, causing, using the computing system, the UI of the wrist-wearable device to perform one or more second functions in response to the one of the finger-swipe command with motion or the finger-drag command with motion.

2. The method of claim 1, wherein the computing system comprises at least one of one or more processors on the wrist-wearable device, one or more processors on a mobile device that is communicatively coupled with the wrist-wearable device, a machine learning system, an artificial intelligence ("AI") system, a deep learning system, a neural network, a convolutional neural network ("CNN"), or a fully convolutional network ("FCN").

3. The method of claim 1, wherein the wrist-wearable device comprises one of a smart watch and a wrist-wearable display device.

4. The method of claim 1, wherein the at least one first sensor comprises at least one biosensor, the at least one biosensor comprising at least one of one or more photoplethysmography ("PPG") sensors, one or more electromyography ("EMG") sensors, one or more sound transducers, or one or more motion transducers, each configured to detect corresponding biological characteristics that correspond to the motion of the soft tissue in or near the wrist of the user on which the wrist-wearable device is being worn, wherein the motion of the soft tissue comprises at least one of motion of one or more muscles, motion of one or more tendons, or motion of one or more blood vessels in or near the wrist of the user.

5. The method of claim 4, wherein the one or more PPG sensors are configured to optically detect blood volume changes in the motion of the one or more blood vessels below skin tissue at or near the wrist of the user corresponding to finger movement of the user, wherein the one or more EMG sensors are configured to detect electrical activity of the motion of the one or more muscles at or near the wrist of the user corresponding to finger movement of the user, wherein the one or more sound transducers are configured to detect sounds within a body of the user corresponding to finger movement of the user, wherein the one or more motion transducers are configured to detect the motion of the one or more muscles, the motion of the one or more tendons, and the motion of the one or more blood vessels corresponding to finger movement of the user.

6. The method of claim 1, wherein the finger-swipe command comprises one of a swipe-up command, a swipe-down command, a swipe-left command, or a swipe-right command, wherein the one or more first functions comprise one of a scroll-up function, a scroll-down function, a scroll-left function, or a scroll-right function for navigating through displayed content on the UI that is displayed on a display screen of the wrist-wearable device.

7. The method of claim 6, wherein the finger-swipe command comprises one of a lifting of the finger or a lowering of the finger, each relative to a relaxed pose of fingers of a hand of the user and each performed at a first speed.

8. The method of claim 1, wherein the finger-drag command comprises one of a drag-up command, a drag-down command, a drag-left command, or a drag-right command, wherein the one or more first functions comprise one of a move-up function, a move-down function, a move-left function, or a move-right function for navigating through displayed content on the UI that is displayed on a display screen of the wrist-wearable device.

9. The method of claim 8, wherein the finger-drag command comprises one of a lifting of the finger or a lowering of the finger, each relative to a relaxed pose of fingers of a hand of the user and each performed at a second speed.

10. The method of claim 1, wherein the at least one second sensor comprises at least one of an inertial measurement unit ("IMU") sensor or a gyroscope-based sensor.

11. The method of claim 1, wherein the one or more second functions comprise at least one of a scroll function or a drag function, each along a direction based on a degree of supination or pronation of a forearm connected to the wrist of the user on which the wrist-wearable device is being worn, as detected by motion of the wrist-wearable device.

12. A wrist-wearable device, comprising:

at least one first sensor that is configured to detect micro-gestures of one or more fingers of a user, without any fingers of the user touching the wrist-wearable device;

at least one processor;

a non-transitory computer readable medium communicatively coupled to the at least one processor, the non-transitory computer readable medium having stored thereon computer software comprising a set of instructions that, when executed by the at least one processor, causes the wrist-wearable device to:

analyze first sensor data to identify micro-gestures of a finger of the user compared with a plurality of predetermined micro-gestures, the first sensor data being received from the at least one first sensor disposed on the wrist-wearable device when the wrist-wearable device is being worn on a wrist of the user, the finger of the user being on the wrist of the user;

in response to identifying a first micro-gesture of the finger of the user in the first sensor data, determine whether the first micro-gesture corresponds to one of a finger-swipe command or a finger-drag command for controlling a user interface ("UI") of the wrist-wearable device; and based on a determination that the first micro-gesture corresponds to one of the finger-swipe command or the finger-drag command for controlling the UI of the wrist-wearable device, cause the UI of the wrist-wearable device to perform one or more first functions in response to the one of the finger-swipe command or the finger-drag command;

wherein the first sensor data comprises biological characteristics that correspond to motion of soft tissue in or near the wrist of the user on which the wrist-wearable device is being worn; and at least one second sensor that is configured to detect motion of the wrist-wearable device with respect to at least one axis of rotation among three axes of rotation, wherein the set of instructions, when executed by the at least one processor, further causes the wrist-wearable device to:

analyze second sensor data to detect the motion of the wrist-wearable device with respect to the at least one axis of rotation among the three axes of rotation, the second sensor data being received from the at least one second sensor disposed on the wrist-wearable device when the wrist-wearable device is being worn by the user;

in response to detecting the motion of the wrist-wearable device with respect to the at least one axis of rotation in the second sensor data, determine whether the detected motion of the wrist-wearable device coincides, and operates in conjunction, with the first micro-gesture that corresponds to the one of the finger-swipe command or the finger-drag command for controlling the UI of the wrist-wearable device; and based on a determination that the detected motion of the wrist-wearable device coincides, and operates in conjunction, with the first micro-gesture that corresponds to the one of the finger-swipe command or the finger-drag command for controlling the UI of the wrist-wearable device, cause the UI of the wrist-wearable device to perform one or more second functions in response to the one of the finger-swipe command with motion or the finger-drag command with motion.

13. The wrist-wearable device of claim 12, wherein the wrist-wearable device comprises one of a smart watch and a wrist-wearable display device.

14. The wrist-wearable device of claim 12, wherein the at least one first sensor comprises at least one biosensor, the at least one biosensor comprising at least one of one or more photoplethysmography ("PPG") sensors, one or more electromyography ("EMG") sensors, one or more sound transducers, or one or more motion transducers, each configured to detect corresponding biological characteristics that correspond to the motion of the soft tissue in or near the wrist of the user on which the wrist-wearable device is being worn, wherein the motion of the soft tissue comprises at least one of motion of one or more muscles, motion of one or more tendons, or motion of one or more blood vessels in or near the wrist of the user.

15. The wrist-wearable device of claim 12, wherein the finger-swipe command comprises one of a swipe-up command, a swipe-down command, a swipe-left command, or a swipe-right command, wherein the one or more first functions comprise one of a scroll-up function, a scroll-down function, a scroll-left function, or a scroll-right function for navigating through displayed content on the UI that is displayed on a display screen of the wrist-wearable device.

16. The wrist-wearable device of claim 12, wherein the finger-drag command comprises one of a drag-up command, a drag-down command, a drag-left command, or a drag-right command, wherein the one or more first functions comprise one of a move-up function, a move-down function, a move-left function, or a move-right function for navigating through displayed content on the UI that is displayed on a display screen of the wrist-wearable device.

17. The wrist-wearable device of claim 12, wherein the at least one second sensor comprises at least one of an inertial measurement unit ("IMU") sensor or a gyroscope-based sensor.

18. A non-transitory computer-readable storage medium comprising instructions that, when executed by at least one processor of a computing system, cause the computing system to:

analyze first sensor data to identify micro-gestures of a finger of a user compared with a plurality of predetermined micro-gestures, the first sensor data being received from at least one first sensor disposed on a wrist-wearable device when the wrist-wearable device is being worn on a wrist of the user, the at least one first sensor being configured to detect the micro-gestures of the finger of the user without any fingers of the user touching the wrist-wearable device, the finger of the user being on the wrist of the user;

in response to identifying a first micro-gesture of the finger of the user in the first sensor data, determine whether the first micro-gesture corresponds to one of a finger-swipe command or a finger-drag command for controlling a user interface ("UI") of the wrist-wearable device; and based on a determination that the first micro-gesture corresponds to the one of the finger-swipe command or the finger-drag command for controlling the UI of the wrist-wearable device, cause the UI of the wrist-wearable device to perform one or more first functions in response to the one of the finger-swipe command or the finger-drag command;

wherein the first sensor data comprises biological characteristics that correspond to motion of soft tissue in or near the wrist of the user on which the wrist-wearable device is being worn;

analyze second sensor data to detect motion of the wrist-wearable device with respect to at least one axis of rotation among three axes of rotation, the second sensor data being received from the at least one second sensor disposed on the wrist-wearable device when the wrist-wearable device is being worn by the user;

in response to detecting the motion of the wrist-wearable device with respect to the at least one axis of rotation in the second sensor data, determine whether the detected motion of the wrist-wearable device coincides, and operates in conjunction, with the first micro-gesture that corresponds to the one of the finger-swipe command or the finger-drag command for controlling the UI of the wrist-wearable device; and based on a determination that the detected motion of the wrist-wearable device coincides, and operates in conjunction, with the first micro-gesture that corresponds to the one of the finger-swipe command or the finger-drag command for controlling the UI of the wrist-wearable device, cause the UI of the wrist-wearable device to perform one or more second functions in response to the one of the finger-swipe command with motion or the finger-drag command with motion.

* * * * *